United States Patent
Pan et al.

(10) Patent No.: US 10,133,504 B2
(45) Date of Patent: Nov. 20, 2018

(54) DYNAMIC PARTITIONING OF PROCESSING HARDWARE

(71) Applicant: Futurewei Technologies, Inc., Plano, TX (US)

(72) Inventors: Weimin Pan, Spring, TX (US); Kangkang Shen, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 206 days.

(21) Appl. No.: 15/092,365

(22) Filed: Apr. 6, 2016

(65) Prior Publication Data
US 2017/0293451 A1   Oct. 12, 2017

(51) Int. Cl.
| | |
|---|---|
| G06F 13/36 | (2006.01) |
| G06F 3/06 | (2006.01) |
| G06F 13/28 | (2006.01) |
| G06F 15/78 | (2006.01) |
| G06F 9/50 | (2006.01) |

(52) U.S. Cl.
CPC ............ *G06F 3/0644* (2013.01); *G06F 3/061* (2013.01); *G06F 3/0659* (2013.01); *G06F 3/0688* (2013.01); *G06F 9/50* (2013.01); *G06F 13/28* (2013.01); *G06F 15/7807* (2013.01)

(58) Field of Classification Search
CPC .... G06F 3/0644; G06F 15/7807; G06F 3/061; G06F 13/28; G06F 3/0688; G06F 3/0659
See application file for complete search history.

(56) References Cited

U.S. PATENT DOCUMENTS

| | | | |
|---|---|---|---|
| 6,587,938 B1 * | 7/2003 | Eilert | G06F 9/5061 |
| | | | 712/13 |
| 7,007,276 B1 * | 2/2006 | Kubala | G06F 9/5077 |
| | | | 712/29 |
| 9,135,079 B2 * | 9/2015 | Flemming | G06F 9/45516 |

(Continued)

FOREIGN PATENT DOCUMENTS

| | | |
|---|---|---|
| CN | 101149728 A | 3/2008 |
| CN | 102576310 A | 7/2012 |

(Continued)

OTHER PUBLICATIONS

PCT/CN2017/079559, ISR, dated Jun. 6, 2017.

*Primary Examiner* — Jing-Yih Shyu
(74) *Attorney, Agent, or Firm* — Vierra Magen Marcus LLP (57) ABSTRACT

A system and method of partitioning host processing system resources is provided. An integrated circuit device having a plurality of processors or processing cores and a number of interfaces is portioned at boot into different hardware partitions based on the application needs of the host processing system. The technology provides a non-transitory memory storage including instructions; and a plurality of processors in communication with the memory. The integrated circuit device also includes a plurality of communication interfaces in communication with the processors. At least one of the plurality of processors executes instructions to configure a subset of the plurality of processors to a first hardware partition, and configure a different subset of the plurality of processors and at least one of the plurality of communication interfaces to a second hardware partition.

19 Claims, 8 Drawing Sheets

(56) References Cited

U.S. PATENT DOCUMENTS

| | | | |
|---|---|---|---|
| 2004/0111596 A1 | 6/2004 | Rawson, III | |
| 2005/0283658 A1* | 12/2005 | Clark | G06F 11/2028 714/11 |
| 2007/0250691 A1 | 10/2007 | Cool et al. | |
| 2007/0261059 A1* | 11/2007 | Orth | G06F 12/0284 719/312 |
| 2010/0306494 A1* | 12/2010 | DeVilbiss | G06F 9/5016 711/170 |
| 2012/0036302 A1* | 2/2012 | Lais | G06F 13/28 710/308 |
| 2012/0131210 A1* | 5/2012 | Hegde | H04L 61/6063 709/228 |
| 2014/0149992 A1* | 5/2014 | Zimmer | G06F 9/5077 718/104 |
| 2016/0019095 A1 | 1/2016 | Flemming et al. | |
| 2016/0080477 A1* | 3/2016 | Nedeltchev | H04L 67/02 709/226 |

FOREIGN PATENT DOCUMENTS

| | | | |
|---|---|---|---|
| CN | 103870762 A | | 6/2014 |
| WO | WO2012003007 | * | 8/2012 |

* cited by examiner

Host Memory Map

DYNAMIC PARTITIONING OF PROCESSING HARDWARE

BACKGROUND

There are numerous variations on commercial microprocessor design, with different designs addressing different needs of host processing system manufacturers. Some types of microprocessors are constructed as a "system on chip" (SoC), and include multiple processing cores as well as additional peripherals on a single substrate in order to provide flexibility to manufactures. Often, not all the cores and interfaces are used in an efficient manner. In certain computing applications, some interfaces on the SoC are not utilized, while in other applications, additional interfaces not available on a SoC are required. Where such additional interfaces are needed, an additional SoC or add-on peripheral components, often in the form of a peripheral add-on card in a host processing system, are needed.

One example of the foregoing is host processing systems acting as servers and utilizing the architecture developed by Advanced RISC Machines (ARM). An ARM-based server generally uses multiple ARM based SoCs, each of which has a storage interface which may include Serial Attached SCSI (SAS), Serial ATA (SATA) and/or Peripheral Component Interconnect Express (PCIe) interfaces. The SoC may also include a storage acceleration engine, a network interface, and/or a network offload engine all on chip.

Traditional add-on storage and network adapters used as a solution when additional storage or networking processing is needed are not a cost effective solution on an ARM-based server. Host processing systems used to provide conventional storage services, for example, use add-on storage adapters such as a host bus adapter (HBA) or a redundant array of independent disks (RAID). Other solutions used to provide sufficient resources in a host processing system for storage service applications, such as use of host processing systems with software-based virtual machines, suffer from performance and transparency issues. Additionally, certain functions such as use of a write-back cache acceleration and zero memory copy cannot be provided by such software-based solutions.

SUMMARY

The technology briefly described includes an integrated circuit device having a plurality of processors or processing cores and a number of interfaces which is portioned at boot into different hardware partitions based on the application needs of the host processing system. The technology provides an integrated circuit device, including: a non-transitory memory storage including instructions; and a plurality of processors in communication with the memory. The integrated circuit device also includes a plurality of communication interfaces in communication with the processors. At least one of the plurality of processors executes instructions to: configure a subset of the plurality of processors to a first hardware partition adapted to be accessed by a computer operating system and at least one computing application, and configure a different subset of the plurality of processors and at least one of the plurality of communication interfaces to a second hardware partition adapted to be accesses by a different operating system.

One general aspect includes a computer-implemented method for partitioning hardware components of a multi-core system-on-chip device, the device including a plurality of processing cores, including: generating, with one of the plurality of processing cores, a first hardware partition including a first subset of the plurality of processing cores and a first set of communication interfaces, the first hardware partition adapted to execute a first operating system; and generating with said one of the plurality of processing cores, a second hardware partition including a second subset of the plurality of processing cores and a second, different set of communication interfaces, the second hardware partition adapted to execute a second operating system.

Another general aspect includes a non-transitory computer-readable medium storing computer instructions to partition computing hardware including a plurality of processors, system memory, and one or more communication interfaces, the instructions when executed by one of the plurality of processors cause the one or more processors to perform a number of steps. The steps include initializing the one of the plurality of processors and reading a configuration defining a first hardware partition comprising a first set of the plurality of processors, a first set of communication interfaces, and a first memory map for a first hardware partition of the computing hardware. The instructions further cause one of the plurality of processors to initialize the first set of the plurality of processors, the first set of communication interfaces, and the first memory map to create the first hardware partition. The instructions cause the one of the plurality of processors to perform reading of a configuration defining a second set of the plurality of processors, a second set of communication interfaces, and a second memory map for a second hardware partition of the computing hardware, and initializing the second set of the plurality of processors, the second set of communication interfaces, and the second memory map to create the second hardware partition.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is disclosed to use a processing system's BIOS to partition hardware resources of a host processing system at boot time. The resources may include partitioning host processing system memory, processing cores, storage interface input/output (IO) ports, and network interfaces to any of a computing partition, a storage adapter partition, and/or a network adapter partition based on the intended use of the host processing system. The technology allows a host processing system to be configured with, for example, a storage adapter partition adapted to run a dedicated storage operating system (OS) and storage service software, such as RAID, natively. The same technology can be extended to multiple processor SoC's and other IO subsystems. Based on computing application IO and network workload, a computing partition, storage adapter partition, and/or network adapter partition can be dynamically configured (and later reconfigured, if desired) to maximize host computing system performance. The technology allows for the use of a single hardware platform to offer various application solutions. For example, the single hardware platform may be used to provide a unified server storage networking architecture. For example, a direct-attached storage (DAS) system or a server-based storage area network (SAN) can be implemented on the unified platform based on a change in BIOS configuration. Because the BIOS may be utilized on a number of concurrently used systems providing common types of application, such as for example in a server farm, a chance to the BIOS distributed to a number of systems allows the systems to be re-configured if application needs change.

In accordance with the technology, a single server DAS system can be configured to support PCIe, SSD, and SAS storage systems, provide hardware RAID (R5/R6/EC) acceleration, provide the ability for write-back cache acceleration, and allow for the implementation of zero memory copy. The technology provides a hyper-converged computing, storage and/or networking solution, meaning the benefits of virtual machine flexibility in allocating resources is provided at a hardware level and the use of a dynamic hardware partition maximizes the SoC performance and host processing system performance.

In a distributed server SAN, for example, hardware accelerated distributed SAN storage may be provided through software (BIOS) defined, hardware accelerated architecture. For example, partitioning of a host processing system into storage and compute partitions allows the use of memory-to-memory direct memory access (DMA) to transfer data between a computing partition and a storage partition, which significantly increases bandwidth and performance over, for example, software based solutions. In such a configuration, a storage adapter partition can offer RAID features tied to hardware, such as write back cache acceleration. As illustrated herein, this allows for an optimized data flow to maximize storage array performance in this hardware partition architecture.

Utilizing the hardware partitioning described herein, a unified server storage networking architecture can be implemented without peripheral card storage or peripheral card network adapters, thereby reducing the cost of the platform, and offering better performance than a software RAID solution. Moreover, host OS independent storage software can be utilized without affecting application performance. The unified server storage networking architecture provides better security and error isolation by dynamically partitioning server hardware based IO workload to maximize performance. IO data flow can be further maximized by this partitioning to maximize IO performance. The technology allows for the creation of a unified server storage networking architecture based on a single hardware platform, which can be utilized in multiple use cases with different BIOS partitioning configurations. This provides a true hyper-converged solution with computing, storage, and networking hardware partitions.

Figure 1:
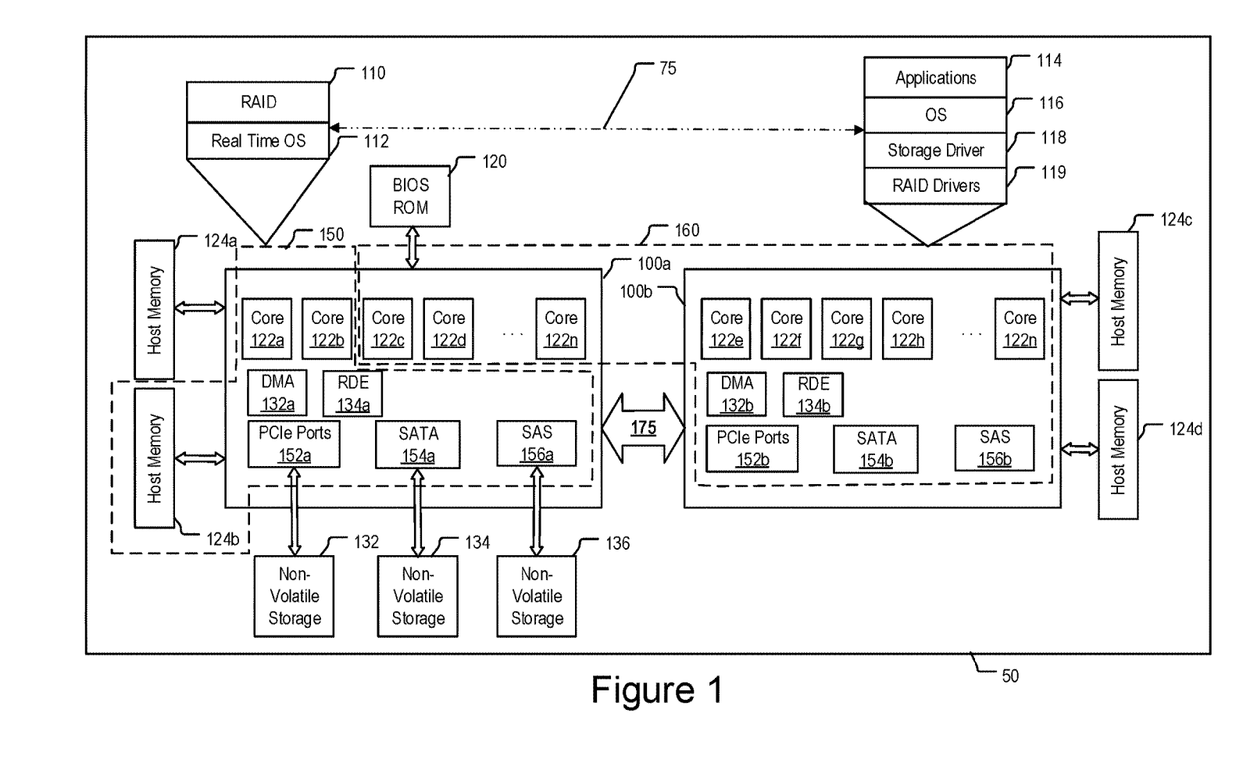
FIG. 1 depicts two integrated circuit SoC devices including multiple processor cores and a storage interface, and illustrates a first partitioning configuration.

In accordance with the foregoing, FIG. 1 depicts two integrated circuit SoC devices 100a, 100b, each including multiple processor cores 122 and a storage interface (interfaces 152, 154 156), and illustrates a first partitioning scheme. Two SoCs 100a and 100b are provided in a host processing system 50, although it should be understood that host processing system 50 may include any number of SoCs and other components (not illustrated in FIG. 1 but described below), including, for example, peripheral components, input/output hardware, communication busses, and other standard computer components.

A first SoC 100a and a second SoC 100b each include any number (n) of processor cores 122a-122n, 122e-122n, a direct memory access (DMA) engine 132a, 132b, a redundant data elimination (RDE) engine 134a, 134b, PCIe ports 152a, 152b, SATA ports 154a, 154b, and SAS ports 156a, 156b. The configuration of the SoCs in FIG. 1 and in this description are exemplary, and it should be understood that in accordance with the technology a SoC may include more or fewer on-chip components in conjunction with the processing cores 122. Each of the storage interface ports (PCIe ports 152a, 152b, SATA ports 154a, 154b, and SAS ports 156a, 156b) may be connected to non-volatile storage (132, 134, 136) associated with the communication type of each such port. As illustrated in FIG. 1, PCIe ports 152a are connected to PCIe non-volatile storage 132. SATA ports 154a are connected to SATA non-volatile storage 134. SAS ports 156a are connected to SAS non-volatile storage 136. The SoC's are connected by a high confidence computing bus 175. Each SoC is also coupled to host memory 124. SoC 100a is coupled to host memory 124a, 124b and SoC 100b is coupled to host memory 124c and 124d. It will be recognized that host memory 124a-124d as illustrated in FIG. 1 is illustrated in a form of memory modules, and that a host system may include any number of memory modules accessible by each of SoCs 100a, 100b.

A BIOS ROM 120 comprises a non-volatile storage device to which code for conducting a boot sequence in a host device 50 in which the components illustrated in FIG. 1 reside. BIOS code resident in ROM 120 is utilized to create dynamic hardware partitions (such as partitions 150 and 160) in accordance with the discussion herein.

Each of the components illustrated in each SoC 100a, 100b may be interconnected via a series of busses and interfaces on chip which are not illustrated in the present Figures for the sake of clarity.

The components of each SoC 100a, 100b may be organized into a first compute partition and at least a second partition. In some embodiments, three partitions may be provided. The second partition may comprise a storage partition or a network partition.

Illustrated in FIG. 1 are two hardware partitions: a storage partition 150 and a compute partition 160. Each hardware partition —the storage partition 150 and compute partition 160 —comprises components of the SoC which are dedicated to execute the functional components illustrated in FIG. 1. Functional components may comprise code executed by the one or more processing cores in each of the storage partition 150 or compute partition 160 area also illustrated. In the compute partition 160, the functional components may include one or more compute applications 114 which run in a compute operating system 116. The compute operating system 116 accesses host memory 124 and non-volatile storage 132, 134, 136 through one or more drivers. In FIG. 1, storage drivers 118 and RAID drivers 119 are illustrated, though it will be understood that any number of component drivers may be utilized in accordance with the technology. The storage partition 150 executes, for example, a RAID storage service 110 running on top of a storage partition operating system comprising real time operating system 112.

It should be understood that any of the hardware components of each SoC in FIG. 1 may be dedicated to a partition, and the particular configuration of the partitions in FIG. 1 is exemplary only. In another embodiment, not all of the components of either SoC need be dedicated to a partition. As discussed herein, there may be additional partitions comprised of different hardware components which are configured for different applications. Storage partition 150 may include cores 122a and 122b, DMA engine 132a, RDE engine 134a, and PCIe ports 152a, SATA ports 154a, and SAS ports 156a. Host memory module 124b (or a portion thereof) may be reserved for use by the storage partition 150 as discussed below. Compute partition 160 includes cores 122c-122n, DMA engine 132b, RDE engine 134b, and PCIe ports 152b, SATA ports 154b, and SAS ports 156b. Computer partition 160 may access host memory in modules 124a, 124c and 124d.

Optimally, the configuration of a partition is designed to make use of those components of the SoC which make the particular application for which the host is to be used in the most effective manner. In FIG. 1, for example, more cores 122 are dedicated to the compute partition 160. Such a partitioning scheme is advantageous, for example, in executing a computationally intensive application (114).

The partitioning of the SoCs further allows for rapid inter-process communication (illustrated as arrow 75) between components of each partition. Any number of techniques may be utilized to implement interprocess communication between functional components. Such communication is facilitated by the shared host processing system memory 124 and trusted on-chip communication busses allows interprocess communication between elements in respective partitions.

Figure 2:
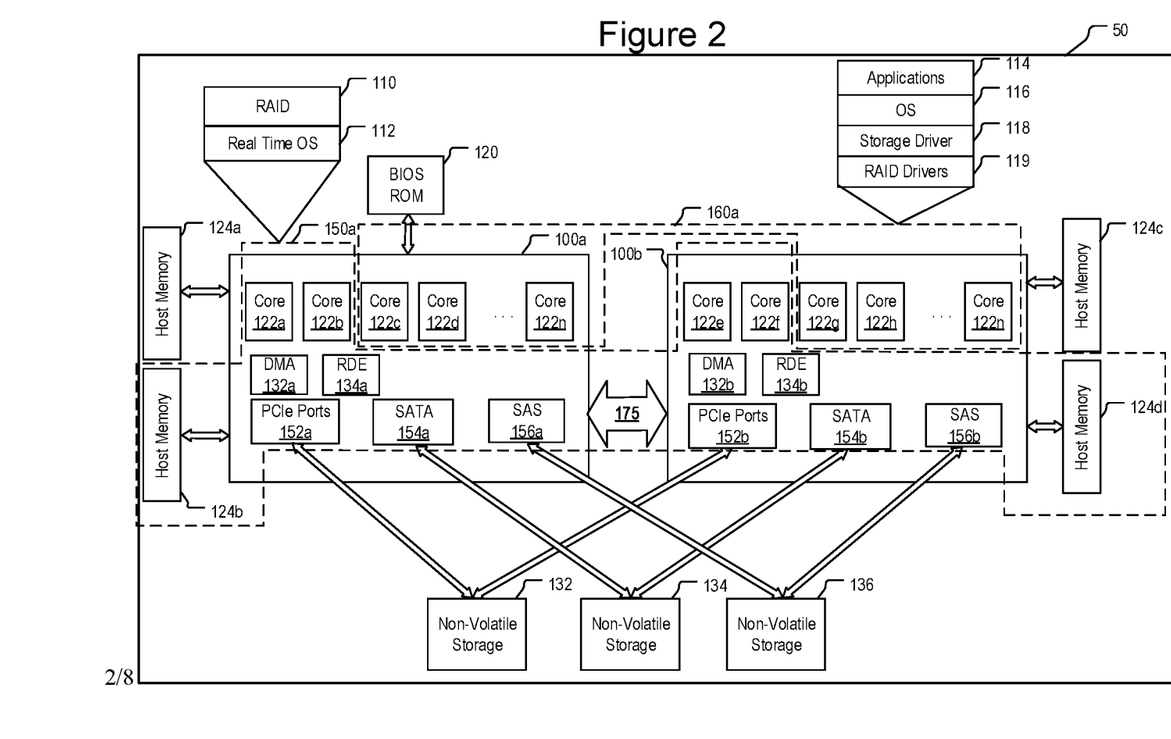
FIG. 2 depicts the two SoC devices of FIG. 1 with a second hardware partitioning configuration which increases the storage partition.

FIG. 2 illustrates a different partitioning for SoCs 100a and 100b which provides more resources for a storage partition 150a. In FIG. 2, like reference numbers represent like parts relative to those reference numbers of FIG. 1. In FIG. 2, a storage partition 150a is illustrated as including those components of storage partition 150 of FIG. 1, as well as cores 122e and 122f, DMA engine 132b, RDE engine 134b, and PCIe ports 152b, SATA ports 154b, and SAS ports 156b. The provision of additional processing cores 122e and 122f, provides greater processing capacity to the storage partition 150a, and greater throughput is provided to non-volatile storage via the use of all data interface ports on both SoCs for the storage partition. The configuration illustrated in FIG. 2 is suitable for use in storage intensive applications of the host device.

Figure 3:
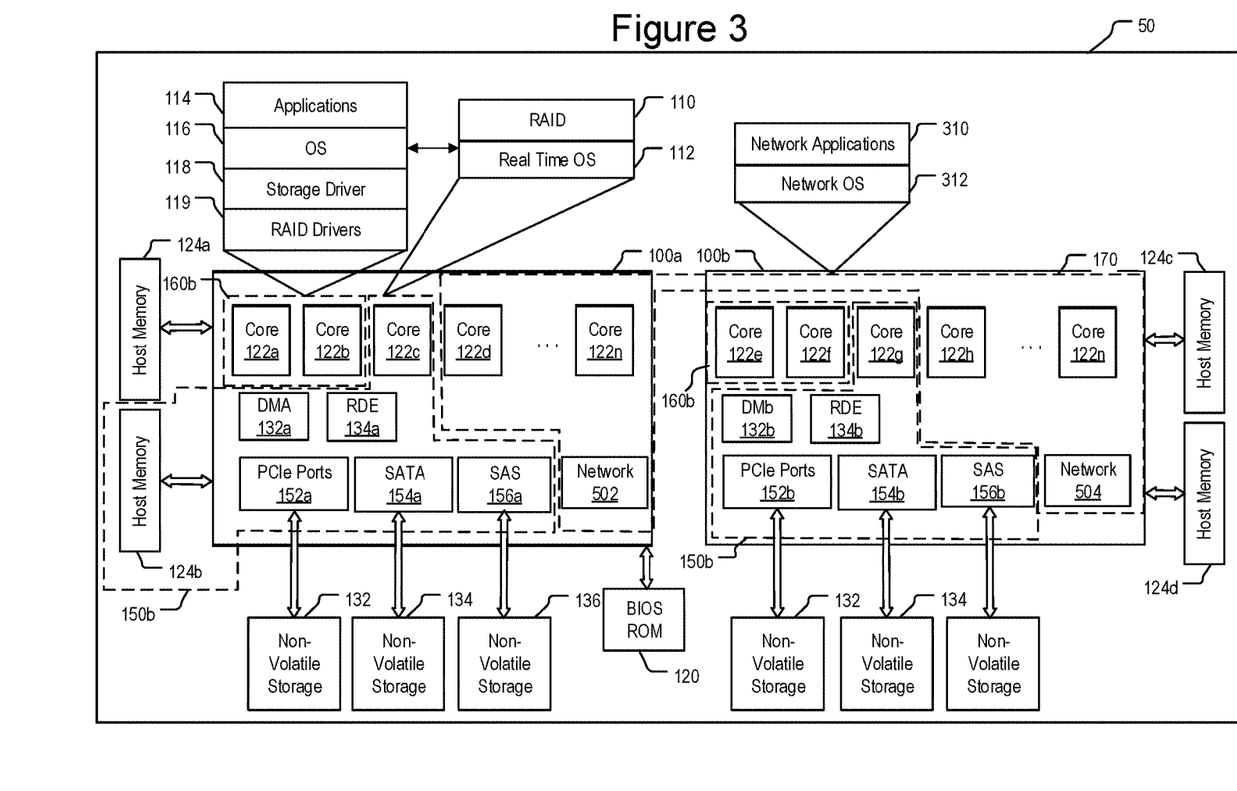
FIG. 3 depicts the two SoC devices of FIG. 1 with a third hardware partitioning configuration which provides a network partition.

FIG. 3 depicts the two SoC devices of FIG. 1 with a different hardware partitioning which provides a network partition 170 in addition to a storage partition 150b and a compute partition 160b. In FIG. 3, like reference numbers represent like parts to those of FIG. 1. In FIG. 3, a compute partition 160b is illustrated as including cores 122a, 122b, 122e and 122f. Storage partition 150b includes cores 122c and 122g, DMA engines 132a and 132b, RDE engines 134a, and 134b, PCIe ports 152a and 152b, SATA ports 154a and 154b, and SAS ports 156A and 156b. A network partition 170 includes cores 122d-122n and 122h-122n, and network interfaces 502 and 504. The use of partitioned processing cores 122d and 122h for the networking partition greater processing capacity for data throughput and processing power in providing networking application and services.

As illustrated in FIG. 3, the network partition may include functional components of a network operating system 312 and network application 310 providing control over networking traffic when the host computing system is utilized, for example, in a network services environment to provide network services such as traffic management, firewalling, hosting, quality of service prioritization, virtual private networking, and similar network services.

In order to create the partitions illustrated in FIGS. 1, 2 and 3, BIOS code specifying each such partition configuration may be loaded into BIOS ROM 120. On boot, one of the cores 122 (referred to herein as a boot core) operating on firmware stored therein will be directed to read instructions from the ROM, check the configuration of the system host, including SoC's 100a and 100b (as well as any other SoC's which are present in the host computing environment 50), and configure the partitions by segregating each of the components illustrated in FIGS. 1 and 2 to a respective partition. Segregation into a respective partition is created by providing access to each of the functional components at a base input/output level. For example, an operating system in the compute partition cannot use a processing core dedicated to the storage partition since the BIOS does not allow access to the hardware components dedicated to the storage partition.

During a BIOS boot sequence, the code in the BIOS ROM will check the ROM first for any custom partition settings, then initialize registers, load device drivers and perform the power-on self-test (POST), determine which devices are bootable and initiate the bootstrap sequence to complete a system boot.

As noted herein, the custom partition settings may be configured by a host processing system administrator based on the use of the host processing system.

It is noted that in FIGS. 1-3, partitioning of elements on the SoCs and host processing system memory is illustrated. The technology is not limited to the elements illustrated in FIGS. 1-3, but may be extended to include any of the hardware elements of a host processing system which may be configured for selective access by a BIOS configuration.

The partitioning is dynamic in that a partition can be created to include or exclude any number of hardware components for a given partition, and the partitioning can be changed for a host or any number of hosts by updating the BIOS code stored in a BIOS ROM on a host computing system. Partitioning occurs during system boot time for a particular host or group of host machines. Thus, in order to change a configuration and a host device from, for example, the configuration of FIG. 1 to the configuration of FIG. 2, the BIOS code may be updated by installing updated BIOS code in the BIOS ROM 120 of a host processing system.

Figure 4A:
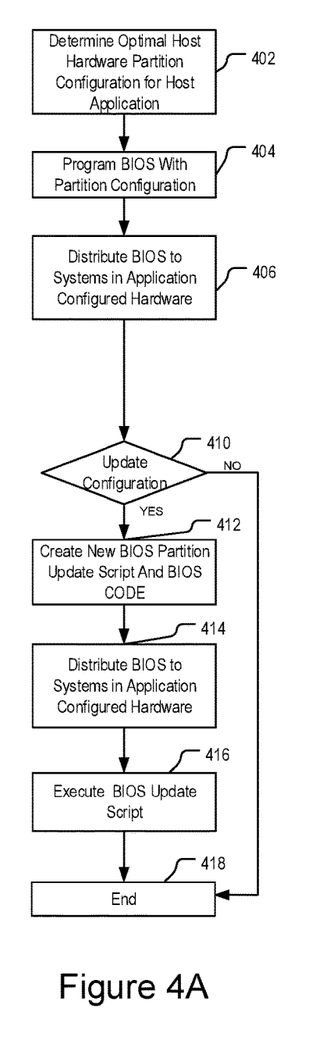
FIG. 4A is a flowchart illustrating a general method for dynamically updating a BIOS in accordance with the present technology.

FIG. 4A is a flowchart illustrating a method in accordance with the present technology which illustrates a sequence for creating and updating hardware partitioning via a BIOS configuration. At 402, an optimal host hardware partition configuration for the host device is determined based on the computing application for which the device will be utilized. Exemplary host computing applications may involve the use of one or more host processing systems 50 as storage servers in a storage area network environment, one or more host computing devices used for intensive computing applications, or one or more hosts used as a content delivery network requiring both storage and network intensive processing. The host hardware partition configuration assigns each of the hardware components in a host processing system to a partition as illustrated above with respect to FIGS. 1-3.

Once an optimal hardware partition configuration is determined, at 404 BIOS code is programmed to partition host processing system hardware in the optimal hardware configuration at boot. As described below with respect to FIG. 4B, when BIOS code stored in a BIOS ROM is read upon a boot of a host processing system, the hardware partitions will be created by the BIOS code assigning each hardware element to one of the respective partitions, with the bios allowing access to each of the respective hardware elements to only certain functional components of the computing environment. For example, a compute partition operating system 116 will only recognize and access to those ones of the processing cores 122 which are assigned to the compute partition. Next, at 406, the BIOS code will be distributed to any number of host processing systems for use with respect to the particular hardware computing application. The distributed BIOS code can be distributed by storing the code in each BIOS ROM of each host processing system of any number of such systems which are to be similarly configured in a processing environment.

BIOS code distribution may be performed at system build time or distributed to host processing systems after installation in the processing environment via programmatic techniques.

In the context of this disclosure, a processing environment may include multiple host processing systems all similarly partitioned to perform the same or very similar processing jobs. For example, a data center may include a plurality of host processing systems configured to run applications designed to implement content delivery network. In this example, hundreds of servers all configured to store and distribute different types of content in a rapid manner may have similar hardware partitioning configurations. Each of the host processing systems using the environment will have a similar hardware partition configuration.

In some circumstances it may be desirable to update the optimal hardware configuration of one or more of the host processing devices in a processing environment. If a configuration is not be updated at 410, then the process of FIG. 4 ends at 418. If the configuration of a host processing systems are to be updated at 410, then a BIOS update script is created at 412. A BIOS update script will alter the configuration of the existing use BIOS ROM distributed with the host computing system. The script may be configured to install new code into the BIOS ROM via well-known techniques, with the BIOS code including a different hardware partition configuration than the code previously installed in the BIOS ROM. At 414, the bios script is distributed to host computing systems in the processing environment. At 416, the BIOS update script is executed and the BIOS configuration of the processing system selected to be updated may be provided with a new hardware partition configuration. It should be recognized that steps 410 through 416 can be performed any number of times as necessary to update host systems. Because the partitioning occurs upon boot of the host processing system, each of the host processing systems to which a new, reconfigured hardware partition has been distributed must be updated and rebooted accordingly.

Figure 4B:
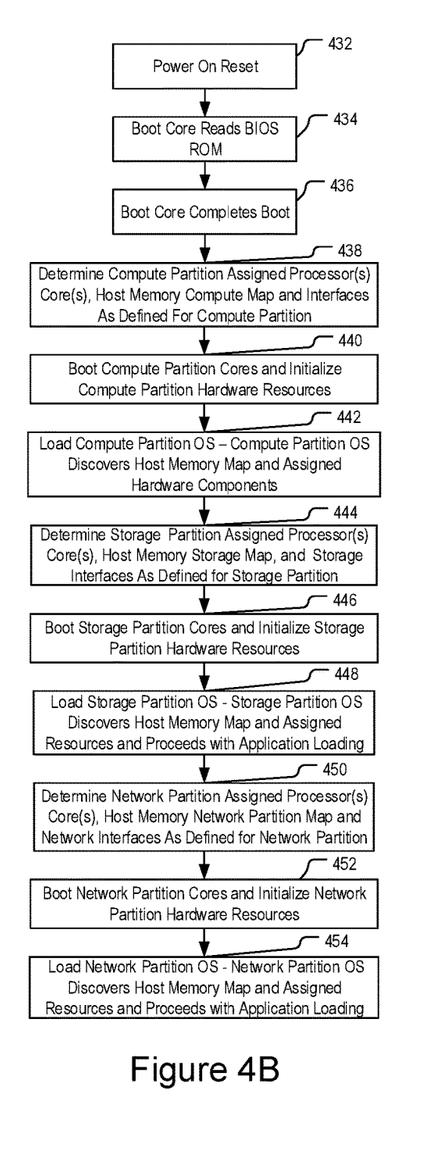
FIG. 4B is a flowchart illustrating a BIOS boot and partitioning process.

FIG. 4B illustrates the process which occurs upon boot of a host processing system to which BIOS code configured for hardware partitioning has been distributed. In a boot process, at 432 one of the cores 122 in one of the SoC's in a host processing system, herein referred to as a boot core; other cores are enabled following the boot core. The boot process begins at 432 with a Power On Reset (POR) where a hardware reset initiates the boot core execution from the boot ROM. The boot code in the Boot ROM uses host processing system configured boot select options to determine the boot flow behavior of the boot core SoC and other SoCs in the host processing systems. Once the boot core completes a reset at 432, it will start executing from a base memory address location. The boot core will read a processor Start Address (PSA) to get the boot ROM address and jump to that location. At 434, the boot ROM is read for the boot code. The boot code may take the form of a hex file or image which is loaded by a boot loader. The boot core will then execute the boot code from the processor start address. At 436, once the boot core has booted, other cores in the SoC can be booted.

Boot code instructions include the hardware partitioning information for the SoC, and may include instructions for partitioning of other hardware components of the host processing system. At 438, the compute partition is created by determining which of one or more processor cores and storage interfaces of the SOC are assigned to the compute partition. Assigning the cores and interfaces to the storage partition comprises making the components accessible to an operating system and applications via the low-level interfaces controlled by the BIOS. Components that are not accessible will not be visible to the operating system running in the compute partition.

At 440, those cores assigned to the compute partition may be booted and compute partition resources initialized. To boot compute partition cores, corresponding registers in the boot ROM which enable compute core functionality are read by the compute partition cores. Once each compute partition core is enabled, it may start fetching boot instructions from the Boot ROM. Instructions for the compute partition cores may be provided from a location which is different than for the boot core. Each compute (and if enabled, storage and network partition) core loads its own boot image and starts executing from a reserved address in the Boot ROM which instructs the core to load its own handler, read its respective PSA and jump to that location. In this manner, the storage partition operating system and applications will only be able to access these particular processing cores and interfaces assigned to the storage partition.

At 442, once the compute partition cores have been initialized, they can begin to load the compute partition operation system, discover the host memory map accessible to the compute partition cores, and discover those hardware components and interfaces assigned to the compute partition.

Similarly, if a storage partition is configured, at 444, the storage partition cores, memory partition and storage interfaces are determined from the boot code and at 446 those cores assigned to the storage partition may be booted and storage partition resources initialized. At 448, once the storage partition cores have been initialized, loading of the storage partition operating system occurs along with discovery of the storage memory map of host memory accessible to the storage partition cores, and discovery those hardware components and interfaces assigned to the storage partition.

If a network partition is utilized, then at 450 the network partition cores, memory partition and network interfaces are determined from the boot code and at 452 those cores assigned to the network partition may be booted and network partition resources initialized. Similarly at 454, once the network partition cores have been initialized, loading of the network partition operating system occurs along with discovery of the network partition memory map, and discovery those hardware components and interfaces assigned to the network partition.

It should be recognized that in various embodiments, a network partition is not utilized and steps 450, 452 and 454 need not be utilized. In other embodiments, a storage partition is not utilized and steps 444, 446, and 448 are not utilized. In still other embodiments, the sequence of booting the compute, network and storage partitions may be ordered differently. For example, the storage partition cores may boot before the compute partition. In other embodiments, booting of the compute, storage and/or network partitions may occur in parallel.

Figure 5:
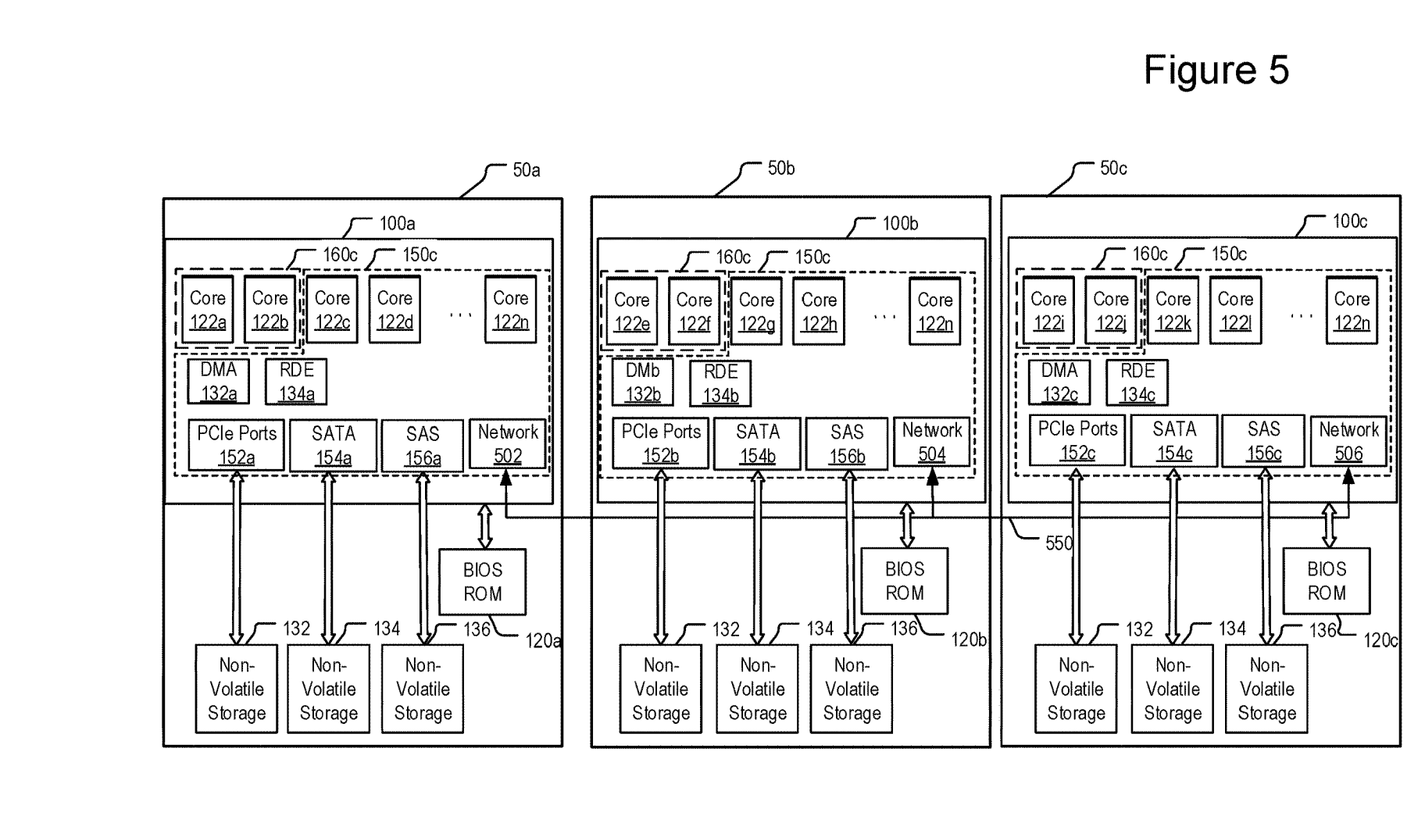
FIG. 5 depicts three SoC devices of FIG. 1 illustrating network scalability of the present technology.

FIG. 5 illustrates the scalability of a compute partition 160c and a storage partition 150c across multiple host processing devices 50a- 50c. FIG. 5 depicts three SoC devices partitioned in a manner similar to those of FIG. 1 in three host processing systems 50a, 50b, 50c. In FIG. 5, host memory 124 and functional components 110 - 119 are not illustrated, but it should be understood that each host processing system 50 includes host memory 124, and that separate instances of each of the functional components 110 - 119 illustrated with respect to host processing system 50a will be implemented on each of host processing systems 50b and 50c. As illustrated in FIG. 5, SoC's 100a, 100b, 100c may have identical partitioning of a storage partition 150c and a portion of a computing partition 160c, and may be connected via a network 550. The SoCs are networked using an on-chip network interface 502, 504, 506 which allows inter-process communication (550) between processes in the storage portion Real Time OS (RTOS) and the computing partition OS of each SoC.

The processing system and hardware partitioning configuration of FIG. 5 may be utilized to implement a hardware accelerated distributed server storage area network. In the implementation of FIG. 5, each BIOS ROM 120a, 120b, 120c includes an identical partition configuration.

In the context of the configuration of FIG. 5, interprocess communication between elements of the compute partition and the storage partition may occur across the network 550. Any number of techniques may be utilized to implement interprocess communication between functional components across the hardware partitions via network 550. The use of shared host system memory 124 and trusted on-chip communication busses allows interprocess communication both between elements in respective partitions and between partitions across network connected host processing systems.

Figure 6:
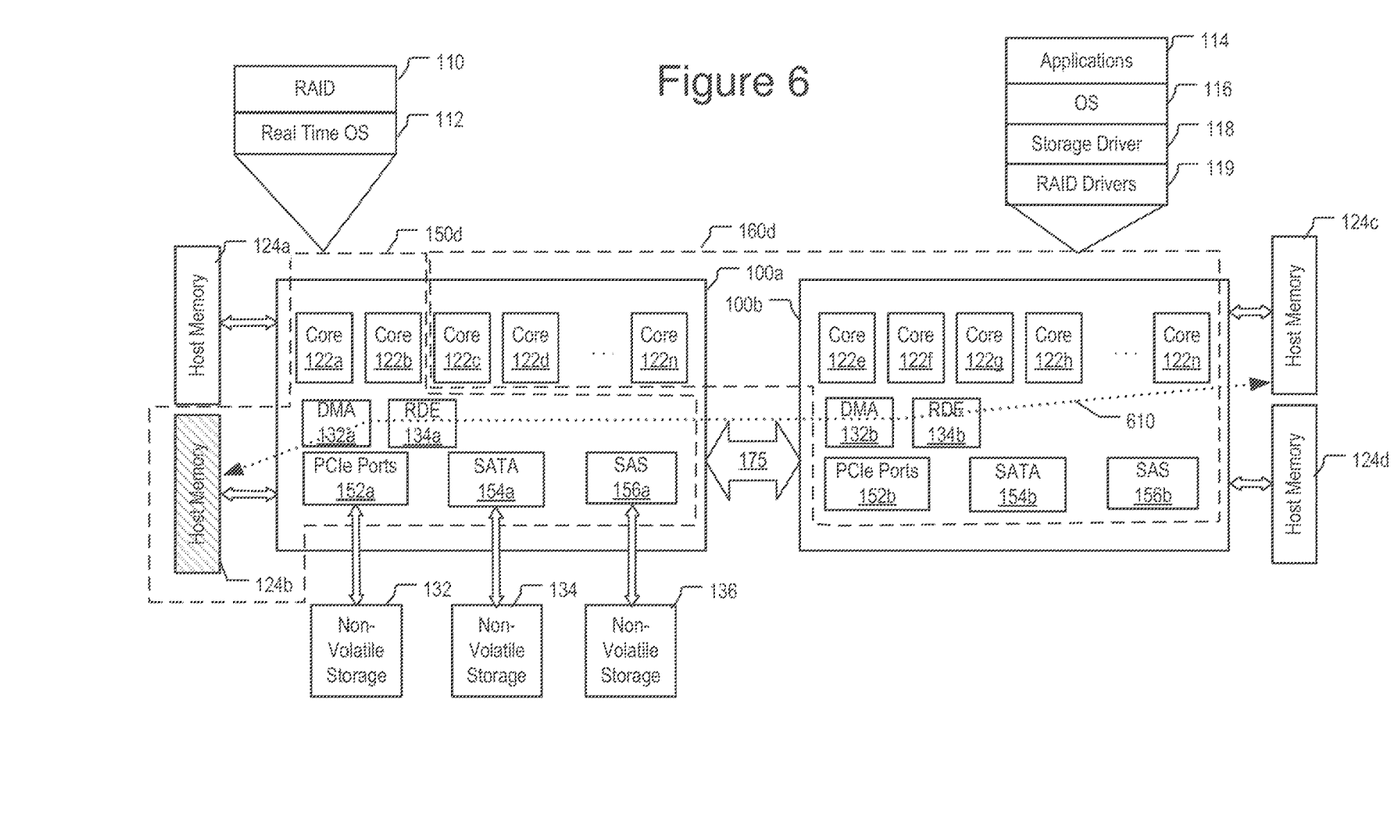
FIG. 6 depicts the two SoC devices of FIG. 1 illustrating data flow between host memories.

FIG. 6 illustrates how an optimized data flow is provided by the dynamic hardware partitioning of the present application. In the example configuration of FIG. 6, a storage partition and a compute partition are configured. Using the DMA controller on the storage partition, data flow (arrow 610) between the host memory modules in the storage and compute partition may be controlled by the DMA controller, lessening the need for CPU input. The storage adapter partition 150d and computing partition 160d may use memory to memory DMA to transfer data between computing partition and storage partition which significantly increases bandwidth and performance of the device over software based solutions. In addition, the storage adapter partition 150d can offer all hardware RAID features, like write back cache acceleration. In an IO operation between host memory 124c, 124d in the compute partition and host memory 124a, 124b in the storage partition, DMA controller 132a in the storage partition can control data throughput in a manner not available in virtual machine environments. Any core in the compute partition can initiate data transfer, turn control over to the DMA controller 132a and wait for an interrupt from the DMA controller when the operation is done. DMA can also be used for "memory to memory" copying or moving of data within memory. Because the DMA controller is also used for intra-chip data transfer in between cores, much less CPU overhead is required.

Figure 7:
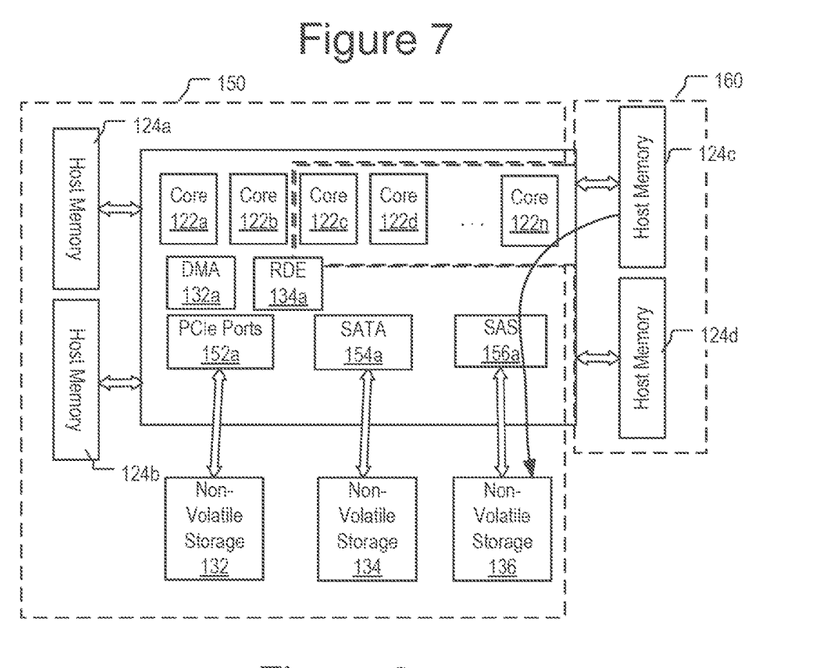
FIG. 7 illustrates data flow between a host memory of a compute partition to non-volatile storage in a storage partition.

As illustrated in FIG. 7, the present technology provides an optimized data path over systems using peripheral components in host processing systems because data can be moved directly from host memory 124c, 124d accessed by the compute partition to any attached non-volatile storage 132, 134, 136. In certain prior art host processing system configurations which utilize a peripheral card to provide additional storage interface ports, IO operations to the storage coupled to the peripheral card interface require data to be written to a non-volatile storage device connected via a port on the peripheral card to first be moved from host memory to the card's specialized memory (for example, RAID memory on the peripheral card) via the peripheral bus connection, and then written to the nonvolatile storage via the peripheral card storage interface. For example, data written to SAS attached RAID storage from host memory first moves from host memory to the RAID memory via PCIe bus, and then is written to the nonvolatile storage connected, via the storage interface port (for example, a SAS port) to the non-volatile storage elements (e.g. a primary disk and mirror disk of a SAS attached storage).

FIG. 7 illustrates data flow in a SoC configured with a compute partition 160d and a storage partition 150d. The compute partition 160d communicates directly with the storage partition storage interfaces using on-chip communication paths such that data for IO operations from the host memory 124c utilized by the compute partition may be written directly to the nonvolatile storage 136 connected via the selected storage interface (in this case the SAS interface) to the respectively attached storage. The dynamic hardware partitioning technology thereby provides an optimized data flow between host memory in the compute partition and non-volatile storage coupled to the storage partition.

Figure 8:
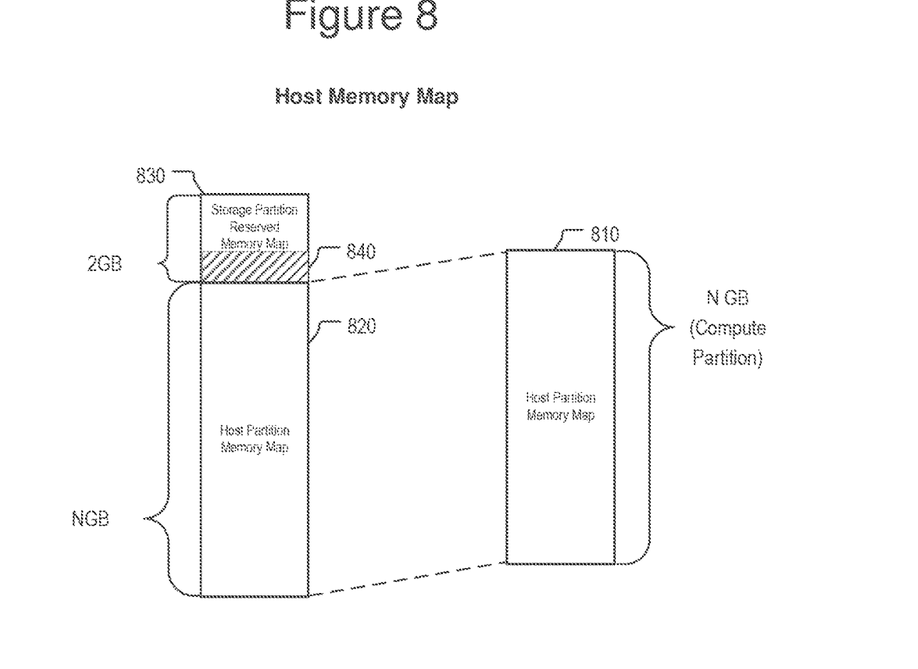
FIG. 8 illustrates host partition memory mapping for use in conjunction with a storage partition.

FIG. 8 illustrates the partitioning of host memory which a portion of the host memory for a storage partition which enables the optimized data path illustrated in FIG. 7. During the boot process, a host system memory map is passed on from boot ROM to instruct each respective (compute, storage and/or network) operating system kernel about host system memory layout. A memory map generally contains the information regarding the size of total memory, any reserved regions and any other details specific to the architecture. FIG. 8 shows a host memory map 810 of compute partition memory within a partitioned host memory map 820. In the illustration of FIG. 8, the host memory map module 820 represents all of the available host memory (in for example modules 124 illustrated herein) in a host processing system. A partitioned memory map 820 has a reserved portion 830—in this example two Gbytes—which is accessible only to the storage partition and is not accessible to the compute partition. It will be recognized that in other partitioning configurations, another reservation of host memory may be made for a network partition. Partitioning of the reserved storage partition memory is accomplished by the BIOS provision of the memory map to the respective partition operating systems—the compute OS, the storage partition OS and/or the network partition OS. In this example, the reserved portion 830 is utilized by the storage partition to implement RAID memory and can thereby provide RAID features which are unavailable in storage solutions using virtual server implementations. For example, a sub-portion 840 of the reserved portion 830 may be used as a write-back cache. The write-back cache feature allows a write IO operation directed to a non-volatile storage device may be directed to a write-back cache and completion is immediately confirmed to the computer partition processing core. This results in low latency and high throughput for write-intensive applications.

Partitioning of the host memory 124 is performed by BIOS code in the BIOS ROM. In the Example of FIG. 8, the BIOS partitions host memory and assigns portions of the memory to the RAID partition and host partition. The BIOS sets the host partition memory as sharable so RAID partition DMA engines can access host partition memory. A RAID application discovers not sharable memory as its own memory and sharable memory as host memory and properly set its memory map.

Figure 9:
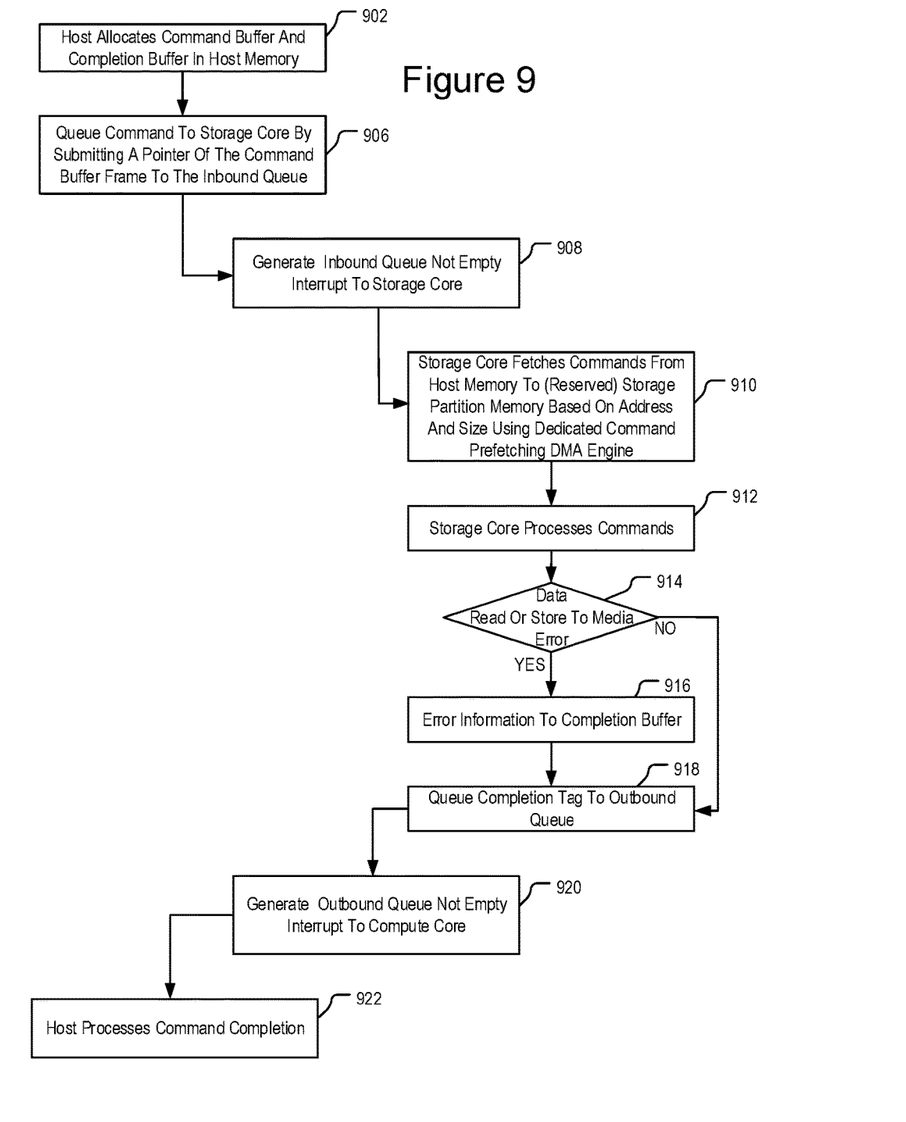
FIG. 9 is a flowchart illustrating control flow for instructions for a storage partition implementing RAID storage in a SoC of the present technology.

FIG. 9 illustrates a method for performing a direct write to a storage system graphically illustrated in FIG. 7. In one embodiment, in order to implement IO operations between a host memory compute partition and a storage partition, a separate control plane is provided. The control plane utilizes a messaging system between the partitions implemented using a command buffer and completion buffer in host memory, and an inbound queue and outbound queue between the host memory and the storage partition. The example of FIG. 9 will be presented with respect to the use of a RAID system in the storage partition, but in other examples other storage systems may be utilized.

At 902, a host processing system compute partition allocates a command buffer and a completion buffer in host processing system memory. The host memory for the command buffer and completion buffer comprise memory accessible to the compute partition and are divided into fixed size frames.

At 906, a command to the storage subsystem is queued by submitting a pointer of the command buffer frame to the inbound queue of the messaging system. As a result, at 908, and inbound queue not empty interrupt is generated for the storage partition core in the storage partition.

At 910, the storage core fetches commands from the host memory to the reserved storage partition memory (here acting as RAID memory for a RAID application) based on the address and size using a dedicated command prefetching DMA engine. At 912, the storage core in the storage partition processes the commands in the inbound queue. Processing commands can include any number of IO operations to the non-volatile storage attached to the storage partition.

At 914, a determination is made as to whether or not a DMA error has occurred. If so, then the error information is written to the completion buffer at 916. If there is no data read or store-to-media error, or after writing the error information to the completion buffer at 916, a completion tag to the outbound queue is queued in the completion buffer at 918. At 920, an outbound queue not empty interrupt is generated for the computer core. At 922, the host processes the command completion.

A host processing system 50, in addition to the elements shown in FIG. 1, may include other components not illustrated herein. For example, additional non-volatile storage may be coupled to the SoC and include code operable to instruct the processor to perform any one or more of the methods or computer based functions disclosed herein. Non-volatile storage 134 may comprise any combination of one or more non-volatile computer readable media. The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Other elements included in the host processing system 50 may include, by way of example, a display unit (output device), an input device, and one or more communication busses coupling the components of the host processing system.

Computer program code for carrying out operations for aspects of the present disclosure may be written in any combination of one or more programming languages, including an object oriented programming language conventional procedural programming languages.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The technology provides a number of advantages over existing solutions. In particular, where SoCs having on-chip storage interfaces and networking interfaces are combined with multi-core processors, no additional storage or network adapters are needed to provide an optimal number of interfaces for a given computing application, as such on-chip interfaces can be assigned for use in respective partitions as needed. This reduces the cost of RISC processor architecture solutions. The technology provides better overall features and performance than software (virtual machine) based storage solutions, such as RAID software solutions. The technology allows for the use of host-independent storage software, and provides better security and error isolation than software based solutions.

The technology allows for the dynamic partitioning of a hardware platform based IO workload to maximize performance for different computing applications, and can provide an optimized IO data flow to maximize IO performance. A single hardware platform allows a manufacturer to utilize one hardware configuration for different use cases by altering the partitioning of the system using a different BIOS configuration to provide a true hyper-converged solution for computing, storage, and networking applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An integrated circuit device, comprising:
a non-transitory memory storage comprising instructions; and
a plurality of processors in communication with the memory:
a plurality of communication interfaces in communication with the processors;
wherein at least one of the plurality of processors executes BIOS instructions to:
configure a subset of the plurality of processors and at least one of the plurality of communication interfaces to a first hardware partition configured to be accessed by a compute operating system and at least one computing application and initiate a boot sequence to assign the subset of the plurality of processors as the first hardware partition; and
configure a different subset of the plurality of processors and at least one of the plurality of communication interfaces to a second hardware partition configured to be accesses by a different operating system, and initiate a boot sequence to assign the different subset of the plurality of processors as the second hardware partition.

2. The integrated circuit device of claim 1 wherein the plurality of communication interfaces comprise non-volatile storage interfaces configured to communicate with storage devices external to the integrated circuit device, and wherein the second hardware partition comprises a storage partition.

3. The integrated circuit device of claim 1 wherein the plurality of communication interfaces comprise network interfaces configured to communicate with a network, and wherein the second hardware partition comprises a network partition.

4. The integrated circuit device of claim 1 wherein the integrated circuit device further includes at least one direct memory access (DMA) controller and wherein the one or more processors execute instructions to assign the at least one DMA controller to the first hardware partition or the second hardware partition that is assigned.

5. The integrated circuit device of claim 1 wherein the non-transitory memory storage comprises a read only memory, and the instructions comprise processor boot instructions for the one or more processors configured to cause the one or more processors to assign the subset and the different subset upon initialization of each of the plurality of processors.

6. The integrated circuit device of claim 1 wherein each of the plurality of processors comprises a processing core of a multi-core processor, and the plurality of processors is integrated with the communications interfaces in a system-on-chip.

7. The integrated circuit device of claim 1 wherein the one of the plurality of processors executes instructions executes instructions to create a messaging system between the first hardware partition and the second hardware partition, the messaging system including a command buffer and completion buffer in host memory, and an inbound queue and outbound queue between the host memory and the storage partition.

8. The integrated circuit device of claim 1 wherein the one of the plurality of processors executes instructions to provide a first memory map to the first hardware partition and a second memory map to the second hardware partition, each memory map reserving a portion of the memory for use by each respective partition.

9. The integrated circuit device of claim 1 wherein the first hardware partition is configured to execute a first operating system and a compute application using the subset of the plurality of processors, and the second hardware partition is configured to execute a second operating system.

10. A computer-implemented method for partitioning hardware components of a multi-core system-on-chip device, the device including a plurality of processing cores and communication interfaces, comprising:
generating, with one of the plurality of processing cores executing BIOS instructions on boot, a first hardware partition comprising a first subset of the plurality of processing cores and a first set of communication interfaces, the first hardware partition configured to directly execute a first operating system; and
generating, with said one of the plurality of processing cores executing said BIOS instructions on boot, a second hardware partition comprising a second subset of the plurality of processing cores and a second, different set of communication interfaces, the second hardware partition configured to directly execute a second operating system.

11. The computer-implemented method of claim 10 wherein the plurality of communication interfaces comprise non-volatile storage interfaces configured to communicate with storage devices external to the multi-core system-on-chip device, and wherein the method further includes executing with second subset of the plurality of cores, a real time storage operating system.

12. The computer-implemented method of claim 11 wherein the method further includes generating with said one of the plurality of processing cores a first memory map for the first hardware partition and a second memory map for the second partition, each memory map reserving a host processing system memory for use by each of the first hardware partition and the second hardware partition.

13. The computer-implemented method of claim 12 wherein the system-on-chip device further includes at least one direct memory access (DMA) controller and wherein said generating a first hardware partition includes assigning the at least one DMA controller to the first hardware partition.

14. The computer-implemented method of claim 10 wherein the method further includes reading, with one of the plurality of processing cores, a boot read only memory for the instructions and generating the first hardware partition and the second hardware partition upon initialization of each of the plurality of processing cores.

15. The computer-implemented method of claim 10 wherein the method includes creating a messaging system between the first hardware partition and the second hardware partition, including creating a command buffer and completion buffer in host processing system memory, and an inbound queue and outbound queue between the host processing system memory and the second partition.

16. A non-transitory computer-readable medium storing computer instructions to partition computing hardware including a plurality of processors, system memory, and one or more communication interfaces, the instructions when executed by one of the plurality of processors cause the one or more processors to perform the steps of:
  initializing the one of the plurality of processors;
  reading a BIOS instruction configuration defining a first hardware partition comprising a first set of the plurality of processors, a first set of communication interfaces, and a first memory map for the first hardware partition of the computing hardware;
  initializing the first set of the plurality of processors, the first set of communication interfaces, and the first memory map to create the first hardware partition operable to directly execute a first operating system;
  reading the BIOS instruction configuration defining a second set of the plurality of processors, a second set of communication interfaces, and a second memory map for a second hardware partition of the computing hardware; and
  initializing the second set of the plurality of processors, the second set of communication interfaces, and the second memory map to create the second hardware partition as operable to directly execute a second operating system.

17. The non-transitory computer-readable medium of claim 16 wherein the method includes creating a messaging system between the first hardware partition and the second hardware partition, including creating a command buffer and completion buffer in system memory, and an inbound queue and outbound queue between the system memory and the second partition.

18. The non-transitory computer-readable medium claim 16 wherein the plurality of communication interfaces comprise storage interfaces configured to communicate with non-volatile storage devices, and wherein the method further includes executing with second subset of the plurality of cores, a real time storage operating system.

19. The non-transitory computer-readable medium of claim 16 wherein, each memory map reserves a respective portion of system memory for use by each of the first hardware partition and the second hardware partition.

* * * * *